(12) United States Patent
Campmans et al.

(10) Patent No.: US 8,477,025 B2
(45) Date of Patent: Jul. 2, 2013

(54) VEHICLE WITH WARNING DEVICE

(75) Inventors: Theodorus Bernardus Jozef Campmans, Borne (NL); Robert Karel Gerard van de Moosdijk, Haarlem (NL)

(73) Assignees: Lichtveld Buis & Partners B.V. (NL); Lisa 2 Alert B.V. (NL)

( * ) Notice: Subject to any disclaimer, the term of this patent is extended or adjusted under 35 U.S.C. 154(b) by 322 days.

(21) Appl. No.: 12/936,169

(22) PCT Filed: Mar. 23, 2009

(86) PCT No.: PCT/NL2009/050134
§ 371 (c)(1),
(2), (4) Date: Dec. 1, 2010

(87) PCT Pub. No.: WO2009/123444
PCT Pub. Date: Oct. 8, 2009

(65) Prior Publication Data
US 2011/0080276 A1   Apr. 7, 2011

(30) Foreign Application Priority Data
Apr. 1, 2008 (NL) ..................................... 2001423

(51) Int. Cl.
*B60Q 1/34* (2006.01)
(52) U.S. Cl.
USPC ............ 340/465; 340/463; 340/474; 340/475
(58) Field of Classification Search
USPC .................. 340/465, 463, 474, 475
See application file for complete search history.

(56) References Cited

U.S. PATENT DOCUMENTS

| 4,329,544 | A | * | 5/1982 | Yamada ........................... 381/63 |
| 4,876,723 | A | * | 10/1989 | Fang .............................. 381/182 |
| 6,154,125 | A | | 11/2000 | McAuley et al. |
| 6,933,838 | B2 | * | 8/2005 | Yamaki et al. ................. 340/475 |
| 2003/0227376 | A1 | * | 12/2003 | Yamaki et al. ............. 340/425.5 |
| 2004/0051630 | A1 | * | 3/2004 | Van de Moosdijk ....... 340/425.5 |
| 2008/0197998 | A1 | * | 8/2008 | Campmans ................... 340/463 |

FOREIGN PATENT DOCUMENTS

| AT | 9 329 U1 | 8/2007 |
| EP | 1 331 135 | 7/2003 |
| JP | 57 138445 | 8/1982 |
| WO | 2007/015639 | 2/2007 |

* cited by examiner

*Primary Examiner* — Travis Hunnings (57) ABSTRACT

The present invention relates to a vehicle, in particular a lorry or bus, provided with a device for issuing, in the event of the vehicle turning off, an acoustic warning signal in the direction of a warning region next to the vehicle, comprising: —at least one sound source for generating an acoustic warning signal; —at least one sound director, which is connected to the sound source, for sending the acoustic warning signal to the warning region in substantially one or more preferred directions with respect to the vehicle and attenuating the acoustic warning signal outside the warning region in the remaining directions with respect to the vehicle, —control means for switching on the sound source when the vehicle turns off or is about to turn off; wherein the sound director has at least one outlet which is formed at a distance from the vehicle wall such that the warning signal is amplified in the one or more preferred directions as a result of interference as a consequence of reflection against the vehicle wall.

15 Claims, 13 Drawing Sheets

VEHICLE WITH WARNING DEVICE

The present invention relates to a vehicle, in particular a lorry or bus, provided with a device for issuing, in the event of the vehicle turning off, an acoustic warning signal in the direction of a warning region next to the vehicle. The invention also relates to a method for issuing an acoustic warning signal of this type.

The invention relates more particularly to a device and method for making lorries and other vehicles safer with respect to the danger which occurs when they turn off. The invention also relates to a method for issuing a directed acoustic warning signal (sound signal), optionally in combination with light signals, wherein the volume of the sound signal is directed in such a way that said sound signal can be heard at sufficient volume at the locations where persons who are in danger are located or are approaching and little or even minimum possible sound is heard at locations where this is not necessary, in order as a result to limit nuisance as much as possible.

In many situations when turning off to the right (in countries in which vehicles are driven on the left-hand side of the road: turning off to the left), it is desirable to reduce the danger presented by the vehicles turning off. At the present time, there are in the Netherlands and also in other countries many victims, persons who are injured and killed, as a result of the fact that drivers of vehicles have what is known as a blind spot next to the vehicle, especially on the non-driver's side. It is inter alia this blind spot which defines a risk region wherein a road user is particularly at risk of being run over by the vehicle. This risk is also heightened as a result of the fact that when a large vehicle of this type turns right, for example, it often first goes just a little bit to the left, in order to create space, after which it sharply enters the bend to the right. The driver not only has to look out for persons, but often also has to take great care to establish whether there is room, whether any posts or other objects are in the road, etc.

In the meantime, various systems, such as blind spot mirrors and camera systems, have been developed to reduce the number of victims. In addition, there are also other systems which establish with the aid of sensors and electronics whether any persons might be in the risk region, and in that situation issue a sound signal for the driver. This creates a situation in which a driver has to look out both directly on the road, but at the same time must also check a plurality of mirrors and/or screens, as a result of which it becomes increasingly difficult to maintain an overview. However, if the driver should overlook something, or react too late, persons in the risk region or the danger zone are still not given a warning.

Document EP 1 678 016 A (corresponding to WO 2005/039939 A1) describes a sound source which is activated by a proximity sensor provided on the side edge of the vehicle. The proximity sensor can detect the presence of an object in a region on the side edge of the vehicle. If an object is detected, an acoustic warning signal can be issued using an omnidirectional sound source. The sound source is located in the cab of the vehicle so as to alert the driver to the presence of an object on the side edge of the vehicle. The known sound source is therefore not so much intended to warn the object itself when said object gets too close to the vehicle.

Document JP 57 138445 A describes a sound source, such as a buzzer, which is attached to a side mirror of a passenger vehicle. The sound source from this Japanese document is however an omnidirectional source. When the alarm goes off, it can also be heard at locations where this can lead to possible nuisance or confusion for the environment, in particular for other road users.

Figure 1:
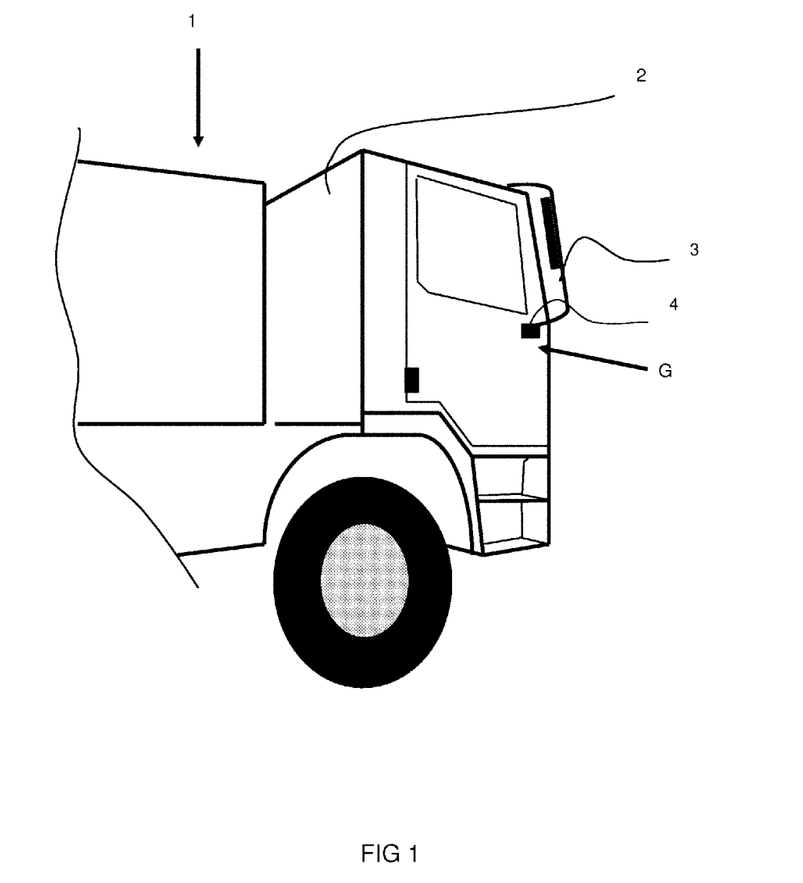
FIG. 1 is a perspective view of a vehicle provided with an embodiment of a warning device according to the invention.

It is possible to issue a sound signal outside the vehicle when the vehicle enters a bend, in combination with light signals. The sound signal warns both the driver that he must take care and the bystanders who are advised by this alarm signal that there may be a threat. The light signals on the side edge of a vehicle help to warn bystanders. A system of this type is for example described in NL 1 020 422 or European patent specification EP 1 331 135 corresponding thereto. The system described therein issues both light and sound signals at the moment when the vehicle turns off. The sound signal is in this system issued from a relatively low location, often in or close to the step for the driver or driver's mate, on the front of the vehicle (FIG. 1, reference numeral 3). An important feature of the character of the turn-off alarm is the fact that the frequency of the sound, in combination with the repetition pattern, differs significantly from, for example, the repetition pattern of the reversing alarms which have been more conventional in the past. The sound is issued by a single omnidirectional sound source and is not specifically directed to the region where the need for warning is greatest. In this case, a warning should be given to persons in the danger zone which extends roughly from a few meters in front of the lorry to a few meters behind the lorry, having a width of a few meters next to the lorry.

An important drawback of the known system is the fact that it issues an omnidirectional sound signal which can also be heard at locations where this can lead to possible nuisance or confusion for other road users or other persons. In order to issue an adequate warning signal toward the rear, in particular, the volume of the sound will have to be so great that it can still be heard toward the side edge even at a fairly great distance.

The object of the invention is to provide a method and apparatus wherein the above-mentioned drawbacks are overcome or at least are reduced.

According to a first aspect of the invention, there is provided for this purpose a vehicle, in particular a lorry or bus, which is provided with a device for issuing, in the event of the vehicle turning off, an acoustic warning signal in the direction of a warning region next to the vehicle, the device comprising:
  at least one sound source for generating an acoustic warning signal;
  at least one sound director, which is connected to the sound source, for sending the acoustic warning signal to the warning region in substantially one or more preferred directions with respect to the vehicle and attenuating the acoustic warning signal outside the warning region in the remaining directions with respect to the vehicle,
  control means for switching on the sound source when the vehicle turns off or is about to turn off;
wherein the sound director has at least one outlet which is formed at a distance from the vehicle wall such that the warning signal is amplified in the one or more preferred directions as a result of interference as a consequence of reflection against the vehicle wall.

After all, if the device has just one outlet, one or more preferred directions can be given to the sound signal as a consequence of the reflections against the vehicle wall. The reflected sound signal would appear in this case to originate from a notional mirror source which is situated on the opposing side of the vehicle wall. The original sound signal and the sound signal originating from the mirror source can interfere with each other to cause the desired amplifying in the preferred direction(s) and damping in the remaining directions. In addition, if two or more outlets are used, it is possible to impart to the sound which originates from the various outlets, as a result of mutual interference, one or more preferred directions which are stronger than if one outlet is used.

According to one embodiment of the invention, the vehicle has a driver's part, in particular a cab, and the device is fastened to the driver's part: on or in proximity to the outside mirror of the vehicle. The device can in a further embodiment also, for example, be integrated in a practical manner into the base, which is often present, of the mirror support.

The placing of the sound source with respect to the wall (for example a door) of the vehicle, in particular on or in proximity to the base of the mirror support, has the advantage that the attention of passers-by will be directed in the direction of the sound, and thus also in the direction where the driver is sitting. This will produce eye contact more easily. It is very likely that the obtaining of eye contact leads to a reduction in the risks, because then each party is more aware of the other's movements. Placement in the environment of the mirror support also has the advantage that the distance from the sound source to bystanders on foot or on bicycles is on average reduced, as a result of which the warning signal will be more effective at a given volume of the source.

A way of directing tonal alarm signals consists in splitting the sound signal and emitting it at roughly half the wavelength of the sound. Just before the outlet openings the signals then add up (as a result of constructive interference), whereas at an angle of 90° the sound from one opening eliminates, owing to the difference in wavelength, the sound from the other opening (destructive interference). A system of this type is described in Netherlands patent NL 1 029 681 and in international application WO 2007/015639 corresponding thereto. When a system of this type is placed on the side edge of a vehicle, allowance must be made for the influence of the reflections against the walls of a vehicle of this type. This can give rise to the drawback of the disruptive influence of reflections which could cause, as a result of interference with the direct sound, regions where the sound is much less loud. However, it has been found that advantageous placement of the opening or openings through which the sound issues outward also allows these reflections to be beneficially utilized.

If for example a single opening is placed at a quarter wavelength of a reflecting surface, the distance to the mirror source is precisely half a wavelength. Thus, the reflecting sound at right angles to the vehicle will be able to completely drown out the direct sound in the event of complete reflection. (The side edges of lorry cabs are generally made of sheet steel, and will indeed be substantially fully reflective at the present sound frequencies.) That is an undesirable situation because a warning signal must be audible in all directions. When the distance from the outlet or outlet opening becomes greater than half a wavelength, regions remain where marked drowning-out occurs as a result of interference. If the distance from the opening to the side edge is selected so as to be about 0.15-0.25 times the wavelength, the lateral drowning-out has been found to be such that enough sound remains at right angles to the vehicle, while the sound will also be sufficiently clearly audible toward the rear in the attention region.

The sound can also bend around the sound director in order to issue sufficient sound forwards. Therefore, it can be a good design to have the sound openings of the source open out at a distance from the reflecting wall that is somewhat less than half a wavelength of the sound. This then does not produce any regions with excessive drowning-out, as a result of which a locally inadequate warning signal could be issued.

The warning device can be used for turning both left and right. In addition, the acoustic warning signal can be provided in combination with other signals, such as light signals. What matters is that the device is embodied to direct sound at a sufficient volume to a region wherein the sound is actually necessary, and at a lower volume in directions where the sound signal may be less loud.

In specific embodiments of the invention, the warning device comprises one or more of the following technical features:

a control or switching unit which ensures that the warning means are switched on when the vehicle turns off;

light signals which, when the vehicle turns off, will alert the bystanders on the side in question of the lorry;

a sound source which issues the acoustic signal;

one or more sound directors for directing the sound signal, which sound directors comprise one or more openings of the source which issues the sound at a consciously selected distance from the side edge of the vehicle and/or a consciously selected distance with respect to one another, in relation to the wavelength of the tonal sound. As a result, the sound from the opening or openings will, in interplay with the reflections of the sound against an acoustically hard face of the vehicle, for example the cab, be loud, as a result of constructive interference, at locations where it is necessary. By means of total or partial destructive interference, it will, by contrast, be less loud at locations where it can be, so that less or no nuisance or disturbance will occur in those directions;

optionally a splitter element to ensure that the sound signal issues, if desired, as two or more coherent sound sources in order in this way to realize the desired sound field;

embodiments wherein the outlet openings or outlets of the sound source are positioned in the desired direction, so that the directing action of the individual outlets also contributes to the desired directing characteristic. Thus, measurements have revealed that, in a given embodiment, the directing action is, for a single opening, at 90° to the main axis approx. 2 dB and at 180°, i.e. straight backwards, approximately 13 dB. These values are indicative, as they are dependent on details in the embodiment and also on the relationship of the wavelength to the transverse dimensions of each individual opening. This directing action of the opening can in the present invention be employed to direct the sound more toward the rear than toward the front.

In a further embodiment, the splitter element is constructed from an input channel which is split into two or more output channels for splitting the warning signal from the sound source into two or more parts and wherein the outlets of the output channels are situated at a fixed distance for providing a fixed phase difference between the two warning signals. As a result, the correct directing action of the warning device can be obtained by way of a single sound source and using very simple means.

In a further embodiment, a splitter element of this type is embodied so as to be at least partly curved, for example with one or more bends so as to be able to provide a compact construction.

According to a further preferred embodiment, the outlets of the device are positioned at a level above the road surface of between 1 m and 2.5 m, preferably between 1 m and 2 m. This is the height which corresponds roughly to the height of the ear of a person on foot or on a bicycle.

According to a further embodiment, the vehicle comprises two or more warning devices, wherein the devices are attached at a differing distance with respect to the front of the vehicle, for example a first device fastened to the cab and a second device fastened to the trailer.

According to another aspect of the invention, a method is provided for issuing, in the event of the vehicle turning off, an acoustic warning signal in the direction of a warning region next to the vehicle, the method including:

providing a vehicle of the sort defined in the present document;

operating the control means for switching on the sound source when the vehicle turns off or is about to turn off;

sending the acoustic warning signal to the warning region in substantially one or more preferred directions with respect to the vehicle and attenuating the acoustic warning signal outside the warning region in the remaining directions with respect to the vehicle.

Further advantages, features and details of the present invention will emerge from the subsequent description of the various preferred embodiments thereof. The description refers to the figures, in which.

FIG. 1 shows a vehicle 1, in particular a lorry, which is provided with a vehicle cab 2 having thereon a mirror support 3. In a region G, in proximity to the base 4 of the mirror support 3, is the region where the directed sound source can, in accordance with the present invention, preferably be fastened, because:

this is at the height of the ear of most bystanders;

the signal is then also clearly audible in the cab;

it is in the direct vicinity of the reflecting side face of the cab, which side face is sufficiently extensive there to make advantageous use of the reflection against this cab, as will be discussed hereinafter; and this draws the bystanders' attention in the right direction and thus promotes eye contact between bystanders and the driver.

Figure 2:
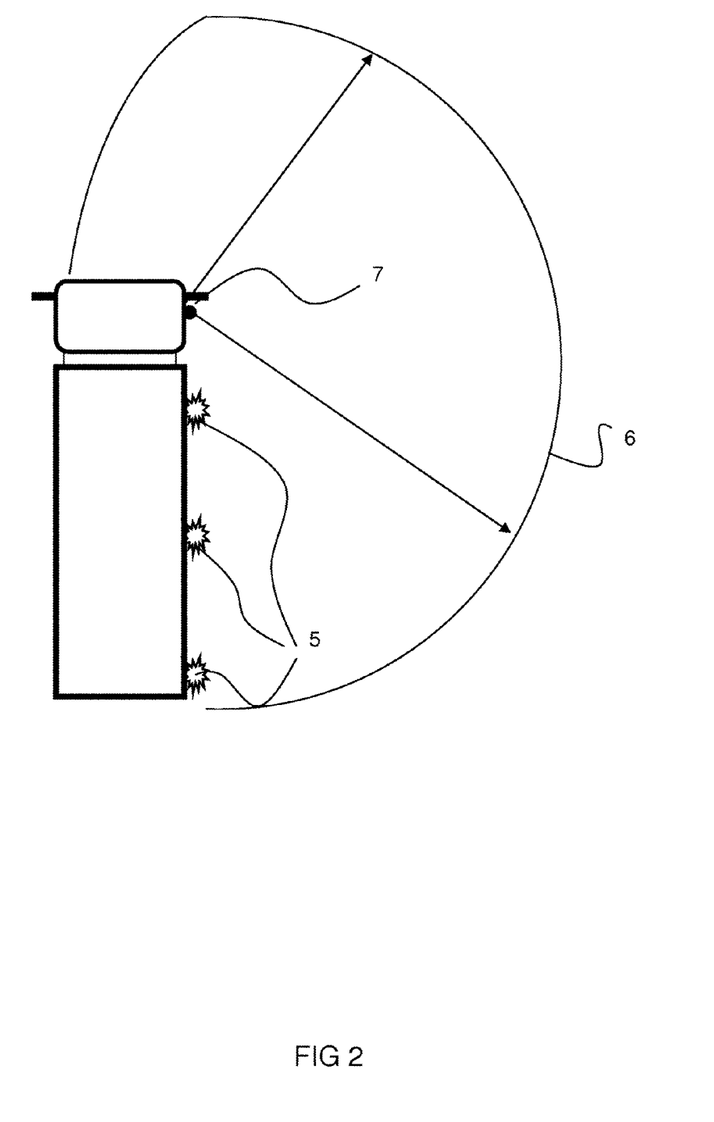
FIG. 2 is a plan view of the vehicle from FIG. 1, wherein the warning region is indicated next to the vehicle.

FIG. 2 is a plan view of a vehicle, with the warning lamps 5 and the overall sound contour 6 (with lines of equal sound pressure level) of a normal, omnidirectional sound source 7 according to the prior art. This pattern is substantially a circle having as its center point the sound source.

Figures 3A, 3B, 3C:
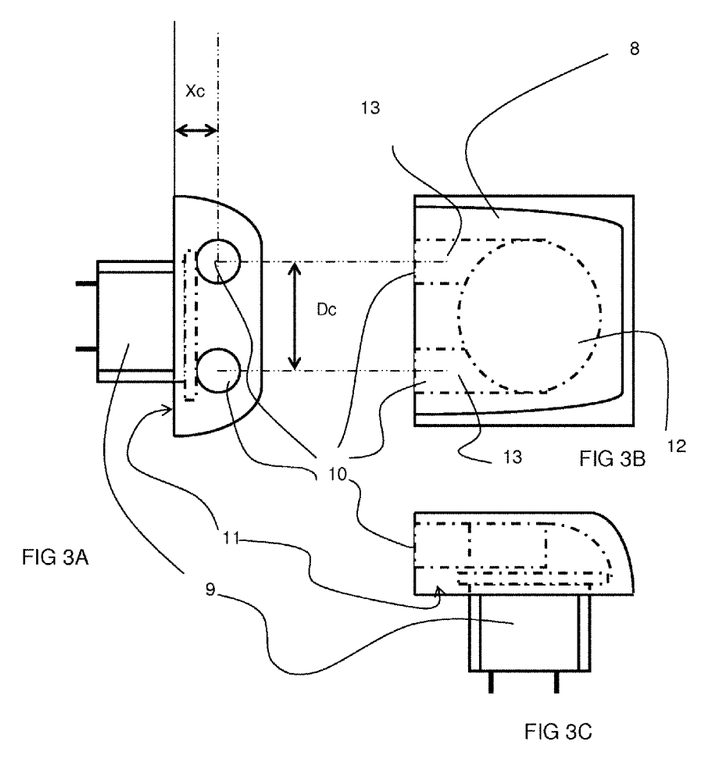
FIG. 3A is a rear view of an embodiment of a warning device with two outlets positioned one above the other.
FIG. 3B is a plan view of the embodiment of FIG. 3A, wherein a part of the interior of the sound director is shown by dot-dash lines.
FIG. 3C is a side view of the embodiment of FIG. 3A.

FIGS. 3A-3C show a preferred embodiment showing the sound directing element 8, wherein the sound source 9 can be built in or integrated. The sound source 9 is connected to an input channel 12 which is provided with two outputs channels 13. The sound source 9 is positioned here at right angles to the axes of the outlets or outlet opening 10 and would have to protrude through a hole in the cab wall, after which said sound source can be connected from the inside out to the electrical wiring. In this case, side faces 11 of the director 8 come to lie against the cab of the vehicle. The two openings 10 are in this case positioned one above the other at a mutual distance Dc which is preferably substantially identical to or somewhat less than half the wavelength of the sound frequency which is used. Xc is the distance to the openings from the side wall of the directing element, which will be placed against the side wall of the cab during assembly. Thus, after assembly, the correct distance to the reflecting surface of the (door of) the cab is ensured on the lorry. This distance Xc will preferably be somewhat less than a quarter of the wavelength of the sound to be operated. In fact, it can also be a reflecting face other than the cab itself, for example at the start of a trailer.

Figure 4:
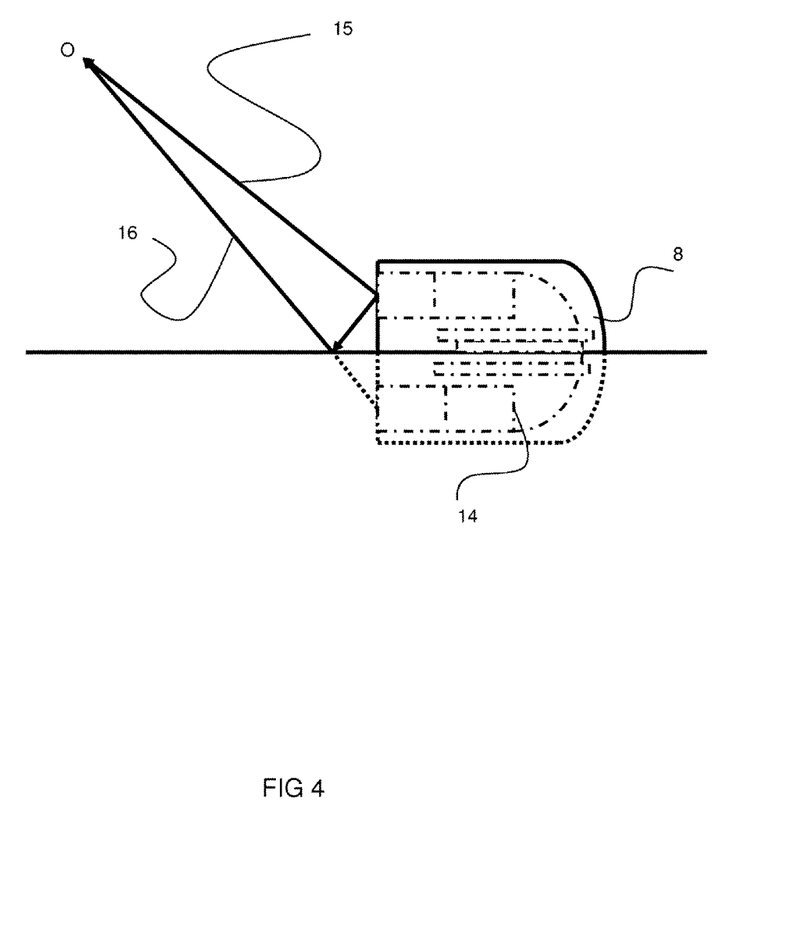
FIG. 4 is a schematic representation of the embodiment of FIGS. 3A-3C, with a first physical sound source and a second, virtual sound source or mirror source.

FIG. 4 represents the sound source 9 with the director 8 for the part which protrudes outside the vehicle, with the virtual mirror source 14 in dot-dash lines. It is also shown that, at a receiver position O, sound passes both via a direct path 15 and via the reflected path 16. The sound via this reflected path 16 would appear to originate from the virtual opening of the mirror source 14.

Figure 5A:
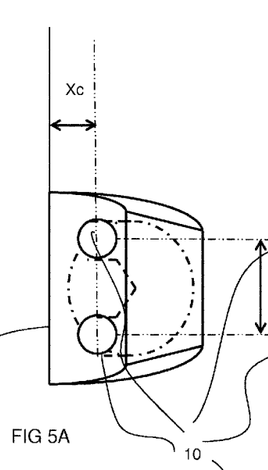
FIG. 5A is a rear view of another embodiment of a warning device with two outlets positioned one above the other.
Figure 5B:
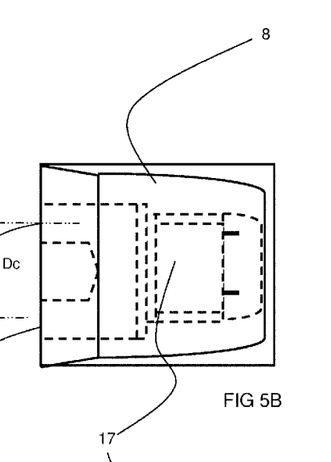
FIG. 5B is a plan view of the embodiment of FIG. 5A, wherein a part of the interior of the sound director is shown by dot-dash lines.
Figure 5C:
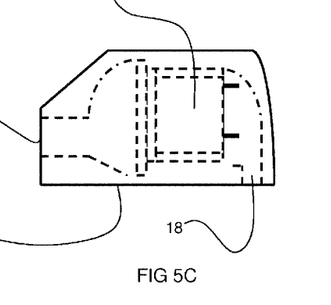
FIG. 5C is a side view of the embodiment of FIG. 5A.

FIGS. 5A-5C show a preferred embodiment which is a variation on the embodiment of FIGS. 3A-3C, the sound source 17 being located entirely within the directing element. This has the advantage that a less large hole has to be made in the wall of the door or cab; however, there will still have to be a fastening to the cab and a feed-through means 18 for the wiring of the sound source.

Figures 6A, 6B, 6C:
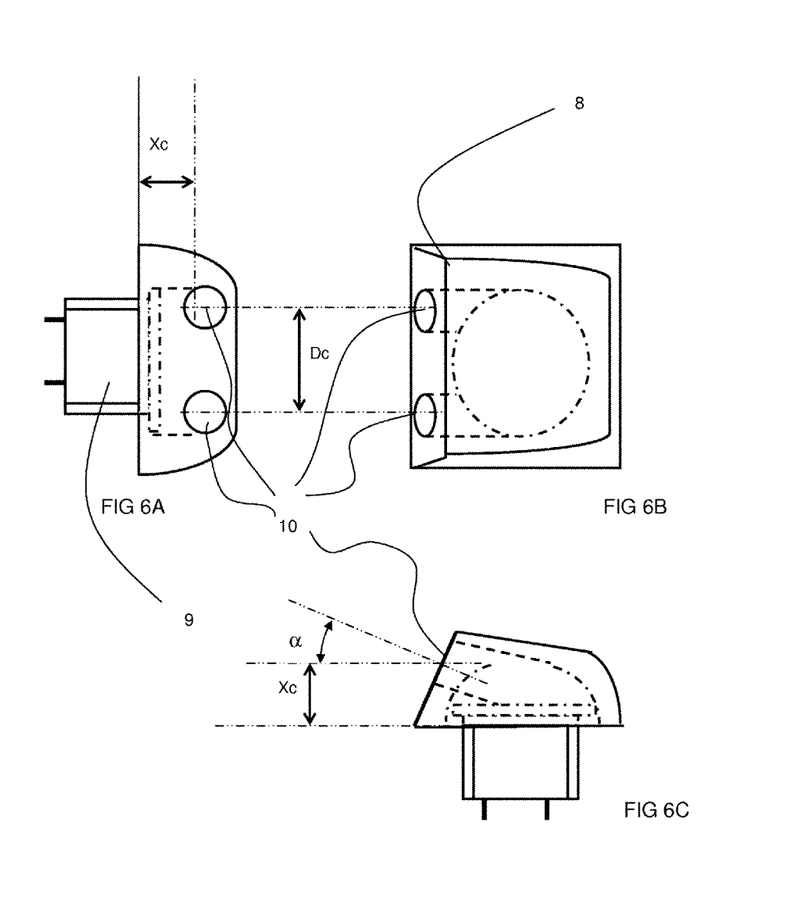
FIG. 6A is a rear view of an embodiment of a warning device with two outlets positioned one above the other and arranged obliquely.
FIG. 6B is a plan view of the embodiment of FIG. 6A, wherein a part of the interior of the sound director is shown by dot-dash lines.
FIG. 6C is a side view of the embodiment of FIG. 6A.

FIGS. 6A-6C show a preferred embodiment which is a variation on the embodiment of FIGS. 3A-3C. In this case, the direction of emission of the individual openings is not parallel to the wall of the lorry, but rather oblique at an angle α thereto. Variation of the angle α allows the sound contour to be influenced and thus to be brought closer to the desired contour.

Figure 7A:
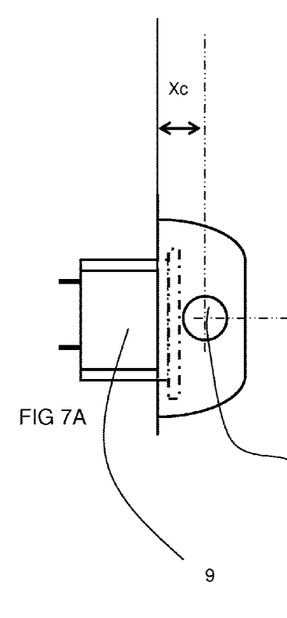
FIG. 7A is a rear view of an embodiment of a warning device with a single outlet.
Figure 7B:
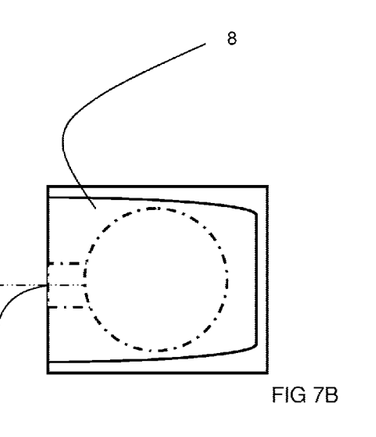
FIG. 7B is a plan view of the embodiment of FIG. 7A, wherein a part of the interior of the sound director is shown by dot-dash lines.
Figure 7C:
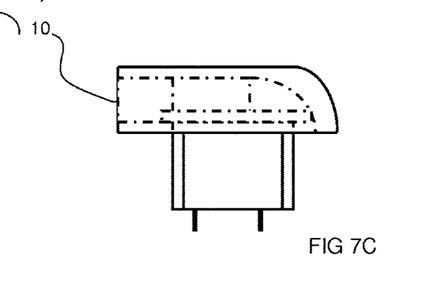
FIG. 7C is a side view of the embodiment of FIG. 7A.

FIGS. 7A-7C show a preferred embodiment of a directing element 8 with just one opening 10. In the case of a single opening, an interference pattern will occur as a result of the interplay with the reflection of the sound in the wall of the vehicle cab in combination with the directing action of the outlet itself. The embodiment with a single opening will direct the sound less markedly backwards because now more sound energy rises and falls. As a result, this variant might, for example, be more suitable for relatively short vehicles.

Figures 8, 8A, 8B, 8C:
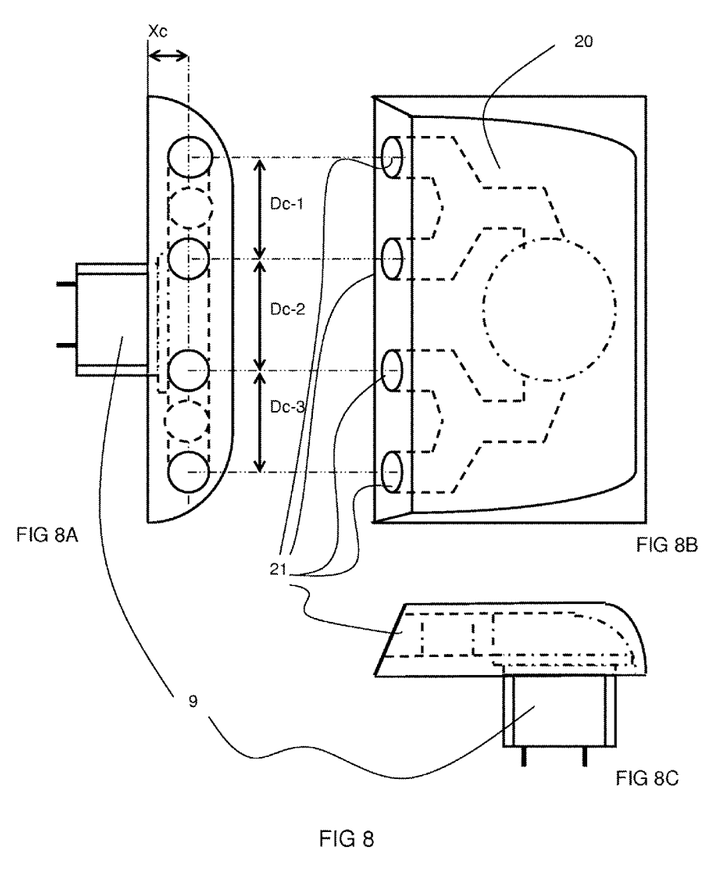
FIG. 8A is a rear view of an embodiment of a warning device with four outlets positioned one above another.
FIG. 8B is a plan view of the embodiment of FIG. 8A, wherein a part of the interior of the sound director is shown by dot-dash lines.
FIG. 8C is a side view of the embodiment of FIG. 8A.

FIGS. 8A-8C show a preferred embodiment of the sound directing element 20 having a total of four openings 21 formed one above another on one line, to be positioned at the aforementioned distance Xc with respect to the reflecting wall of the cab. In this case, in the element, the wavelength from the source to each opening is in all cases the same, thus producing four coherent sources with which the desired interference pattern is produced. If four openings are used, the sound will be directed less markedly upwards and downwards.

Figure 9A:
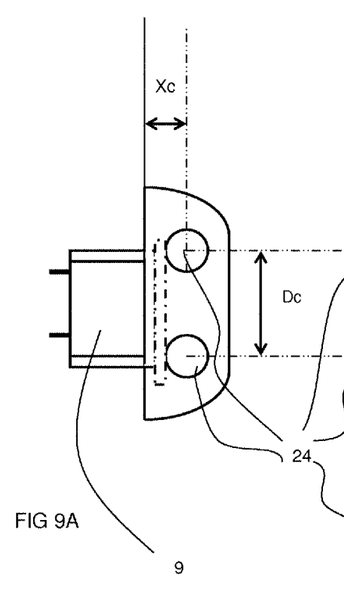
FIG. 9A is a rear view of another embodiment of a warning device with two outlets, positioned one above the other, on the back and a single outlet on the front of the sound director.
Figure 9B:
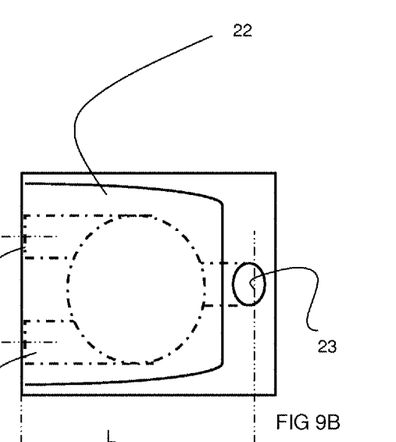
FIG. 9B is a plan view of the embodiment of FIG. 9A, wherein a part of the interior of the sound director is shown by dot-dash lines.
Figure 9C:
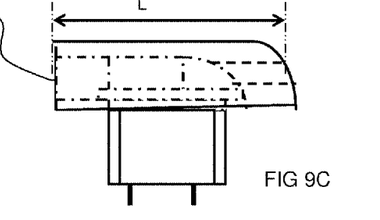
FIG. 9C is a side view of the embodiment of FIG. 9A.

FIGS. 9A-9C show a preferred embodiment of a sound director 22 wherein an additional opening 23 is formed opposing the two outlet openings 24 on the back of the director 22. In this way, it is possible to create a contour which directs the sound more or less markedly forwards, compared to the embodiments with the openings on one side. In this case, the distance L and the size of the sound director are important, as are the transverse dimensions of the opening toward the front. They determine whether the sound from the additional opening amplifies the sound in that direction (L roughly a whole number of times the wavelength or very small with respect to the wavelength) or, by contrast, drowns it out (L roughly an odd number of times half the wavelength). Thus, a variant is also possible wherein two openings are also formed in the opposite direction.

Figures 10A, 10B, 10C:
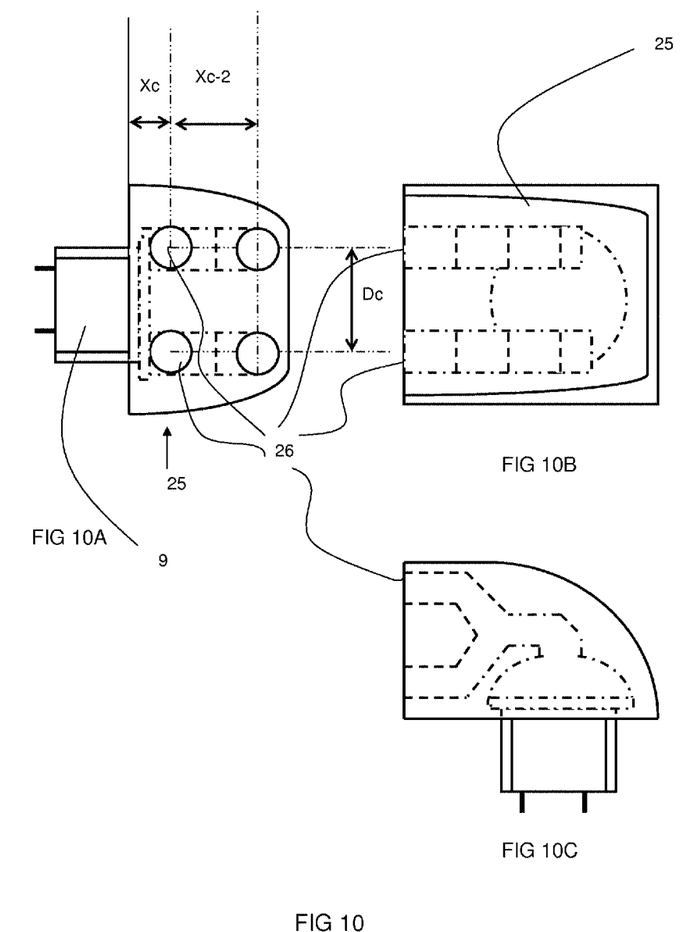
FIG. 10A is a rear view of an embodiment of a warning device with a matrix of two-by-two outlets.
FIG. 10B is a plan view of the embodiment of FIG. 10A, wherein a part of the interior of the sound director is shown by dot-dash lines.
FIG. 10C is a side view of the embodiment of FIG. 10A.

FIGS. 10A-10C show a preferred embodiment of the sound directing element 25, wherein four openings 26 are formed in a rectangular pattern. With this element 25, it is possible to create a directing action which keeps the sound even closer to the vehicle (or the reflecting object) compared to earlier embodiments.

Figure 11A:
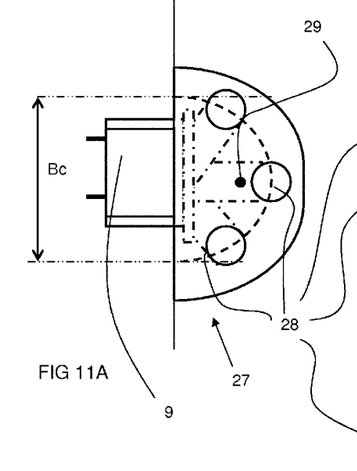
FIG. 11A is a rear view of an embodiment of a warning device with three outlets positioned in the shape of a semi-circle.
Figure 11B:
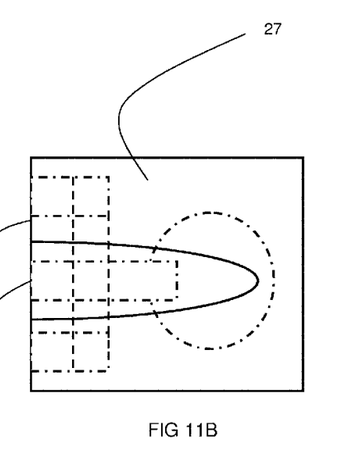
FIG. 11B is a plan view of the embodiment of FIG. 11A, wherein a part of the interior of the sound director is shown by dot-dash lines.
Figure 11C:
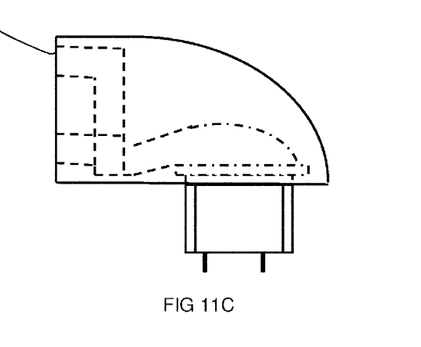
FIG. 11C is a side view of the embodiment of FIG. 11A.

FIGS. 11A-11C show a preferred embodiment of the sound directing element 27 wherein three openings 28 are formed on a semicircle having a diameter Bc. The geometric center point 29 of these three openings is positioned at a distance of approximately 0.67 {i.e. the average of sin(30°), sin(90°), sin(150°)≈0.67} times the radius of this semicircle. In this case, the directing action is obtained as a result of the fact that the sound from the real openings is partly drowned out by the sound from the mirror source. For this purpose, the distance from the center point to the reflecting face should be slightly less than ¼ times the wavelength, so that the distance between the real opening and mirror opening if somewhat less than ½ times the wavelength. Owing to the positioning on a circle, the sound energy remains centered around the axis of the opening plus the mirrored opening. Therefore, it is possible to create using this element a directing action which keeps the sound close along the vehicle (or the reflecting object) compared to the earlier embodiments.

Figure 12A:
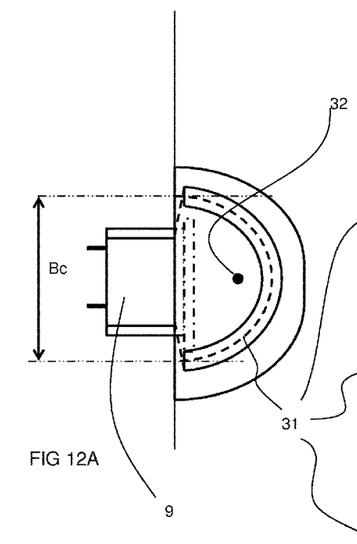
FIG. 12A is a rear view of an embodiment of a warning device with a curved outlet.
Figure 12B:
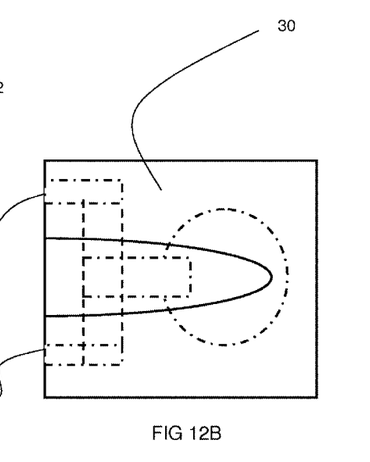
FIG. 12B is a plan view of the embodiment of FIG. 12A, wherein a part of the interior of the sound director is shown by dot-dash lines.
Figure 12C:
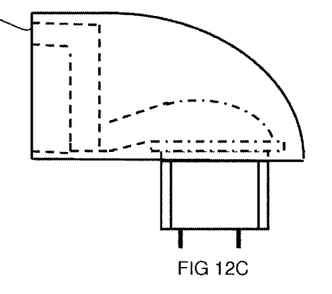
FIG. 12C is a side view of the embodiment of FIG. 12A.

FIGS. 12A-12C show a preferred embodiment of the sound directing element 30, where use is made of one opening 31 having the shape of a semicircle, having a geometric center point 32. The action is comparable to that as described in FIGS. 11A-11C, but is a special extension wherein, as it were, more and more openings are used on a semicircle until the individual openings have touched one another.

Figure 13:
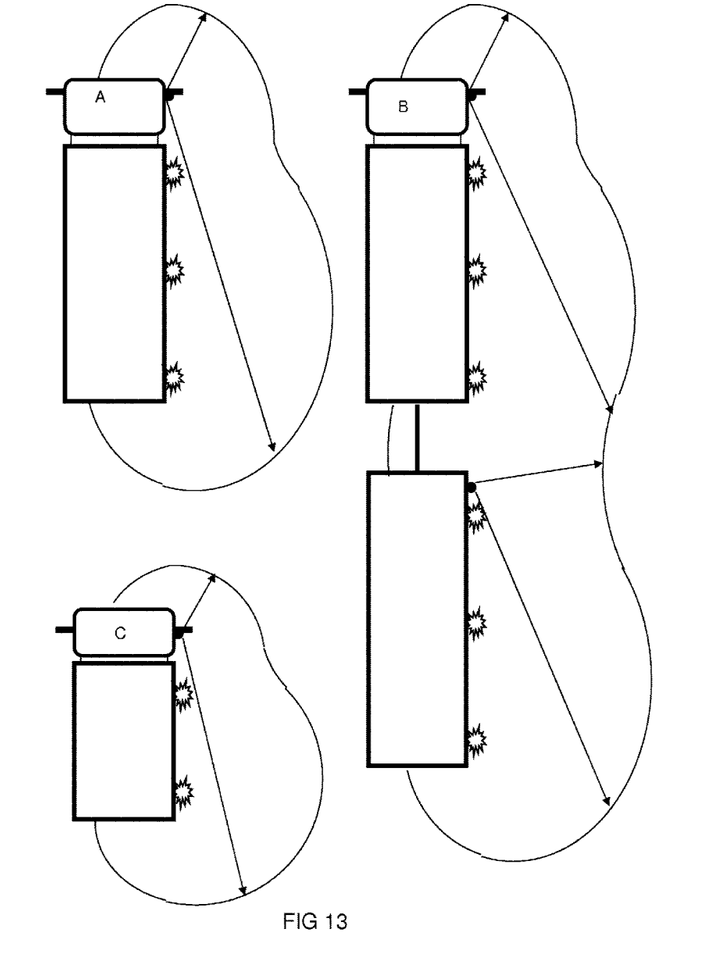
FIGS. 13A-13C show three different arrangements in which the warning devices according to the invention can be used.

Finally, FIG. 13 shows a number of possible contours of identical volume, around vehicles, such as those which can be generated with the aid of the present sound director. Shown around vehicle A is a typical sound contour of a lorry with a sound director as described in FIGS. 3A-3C (two openings toward the rear). Around vehicle B, with the trailer, is an example of a contour which is produced with a sound director as in FIGS. 3A-3C, when this type of sound director is attached both to the vehicle and to the trailer. An alternative to this situation could be use of a director according to FIGS. 7A-7C, since said director also brings the sound further toward the rear. Shown around vehicle C, a shorter vehicle, is a typical contour such as can be obtained using a sound director having a single opening, as represented in FIGS. 6A-6C.

The present invention is not limited to the preferred embodiments described hereinbefore. The rights applied for are defined by the subsequent claims, within the scope of which a large number of adaptations are conceivable and possible.

The invention claimed is:

1. A vehicle (1), in particular a lorry or bus, provided with a device for issuing, in the event of the vehicle turning off, an acoustic warning signal in the direction of a warning region next to the vehicle, the device comprising:
   at least one sound source (9, 17) for generating an acoustic warning signal;
   control means for switching on the sound source when the vehicle (1) turns off or is about to turn off;
   characterized by:
   at least one sound director (8, 20, 22, 25, 27, 30), which is connected to the sound source, for sending the acoustic warning signal to the warning region in substantially one or more preferred directions with respect to the vehicle and attenuating the acoustic warning signal outside the warning region in the remaining directions with respect to the vehicle, and in that the sound director has at least one outlet (10, 21, 23, 24, 26, 28, 31) which is formed at a distance from the vehicle wall such that the warning signal is amplified in the aforementioned one or more preferred directions as a result of interference as a consequence of reflection against the vehicle wall.

2. The vehicle (1) as claimed in claim 1, wherein the device is attached on or in proximity to an outside mirror.

3. The vehicle (1) as claimed in claim 2, wherein the device is integrated with the mirror support (3) of an outside mirror.

4. The vehicle (1) as claimed in claim 1, wherein the distance (Xc) from the side wall of the driver's part up to the one or more nearest outlets is about 0.15 to 0.25 times the wavelength of the warning signal.

5. The vehicle (1) as claimed in claim 1, wherein the average distance (Xc) from the side wall of the driver's part up to the one or more outlets is about 0.15 to 0.25 times the wavelength of the warning signal.

6. The vehicle (1) as claimed in claim 1, wherein the distance (Dc) between neighboring outlets, positioned one above another, is substantially between 0.2 and 0.5 times the wavelength of the acoustic warning signal.

7. The vehicle (1) as claimed in claim 1, wherein the sound director has one or more outlets which are directed substantially backwards.

8. The vehicle (1) as claimed in claim 7, wherein the sound director also has one or more outlets (23) which are directed substantially forwards, as a result of which a warning signal is issued both forward and backwards, but wherein said warning signal is laterally limited in order to limit nuisance.

9. The vehicle (1) as claimed in claim 1, wherein the sound source (17) is provided within the sound director.

10. The vehicle (1) as claimed in claim 1, wherein the sound director comprises at least two outlets (10) arranged substantially one above another.

11. The vehicle (1) as claimed in claim 1, wherein the sound director comprises at least two first outlets, arranged substantially one above another, and also at least two second outlets, arranged substantially one above another, wherein the distance between the first outlets and the side edge of the vehicle is less than the distance between the second outlets and the side edge of the vehicle.

12. The vehicle (1) as claimed in claim 1, wherein the sound director comprises one or more splitter elements for splitting the acoustic signal originating from the sound source.

13. The vehicle (1) as claimed in claim 2, wherein the splitter element is constructed from an input channel which is split into two or more output channels for splitting the warning signal from the sound source into two or more parts and wherein the outlets of the output channels are situated at a fixed distance for providing a fixed phase difference between the two warning signals.

14. A device for issuing an acoustic warning signal, obviously intended for a vehicle (1) as claimed in claim 1.

15. A method for issuing, in the event of the vehicle (1) turning off, an acoustic warning signal in the direction of a warning region (G) next to the vehicle (1), the method including:
providing a vehicle (1) as claimed in one of the preceding claims;
operating the control means for switching on the sound source (9, 17) when the vehicle turns off or is about to turn off;
issuing an acoustic warning signal, and
characterized in that issuing the warning signal includes sending the acoustic warning signal to the warning region (G) in substantially one or more preferred directions with respect to the vehicle (1) and attenuating the acoustic warning signal outside the warning region in the remaining directions with respect to the vehicle (1).

* * * * *